(12) United States Patent
Ahn et al.

(10) Patent No.: US 10,139,712 B2
(45) Date of Patent: Nov. 27, 2018

(54) MAGNIFICATION-PURPOSE EXTERNAL OPTICAL MODULE EXTERNAL TO PORTABLE TERMINAL WITH CAMERA, AND MAGNIFICATION IMAGEING DEVICE INCLUDING THE SAME

(71) Applicant: Yo Shik Shin, Seoul (KR)

(72) Inventors: Jong Woo Ahn, Seongnam-si (KR); Young Hyun Baek, Seoul (KR); Yo Shik Shin, Seoul (KR)

(73) Assignee: Yo Shik Shin, Seoul (KR)

( * ) Notice: Subject to any disclaimer, the term of this patent is extended or adjusted under 35 U.S.C. 154(b) by 280 days.

(21) Appl. No.: 15/305,024

(22) PCT Filed: Apr. 22, 2016

(86) PCT No.: PCT/KR2016/004206
§ 371 (c)(1),
(2) Date: Oct. 18, 2016

(87) PCT Pub. No.: WO2017/183749
PCT Pub. Date: Oct. 26, 2017

(65) Prior Publication Data
US 2018/0210323 A1    Jul. 26, 2018

(30) Foreign Application Priority Data
Apr. 18, 2016 (KR) ........................ 10-2016-0047183

(51) Int. Cl.
*G03B 17/56* (2006.01)
*H04M 1/02* (2006.01)
(Continued)

(52) U.S. Cl.
CPC ......... *G03B 17/565* (2013.01); *G02B 6/0018* (2013.01); *G02B 6/0055* (2013.01);
(Continued)

(58) Field of Classification Search
CPC .. G02B 6/0016; G02B 6/0018; G02B 6/0051; G02B 6/0055; G02B 15/10; G02B 15/22;
(Continued)

(56) References Cited

U.S. PATENT DOCUMENTS

2015/0172522 A1* 6/2015 O'Neill ................ H04N 5/2252
348/240.3
2017/0085761 A1* 3/2017 Shin ..................... H04N 5/2256

FOREIGN PATENT DOCUMENTS

JP           4175502 B2    8/2008
KR    10-2014-0003794 A   1/2014
(Continued)

OTHER PUBLICATIONS

PCT International Search Report dated Apr. 22, 2016, issued by the International Patent Office in corresponding application PCT/KR2016/004206.

*Primary Examiner* — Stephen F Husar
(74) *Attorney, Agent, or Firm* — Stein IP, LLC

(57) ABSTRACT

Provided is a magnification-purpose external optical module external to a portable terminal at which a camera is installed, and a magnification imaging device including the module. An external optical module of the present invention may use an LED and a camera internal to a portable terminal such as a smart phone and thus capture a a high magnification image without a separate lighting source. Furthermore, an external optical module of the present invention does not need to use a separate lighting source because its thickness is implemented to be significantly thin and thus its focal length is designed to be significantly short, and it is possible to sufficiently illuminate a subject with a relatively distant LED in contrast to a thinned thickness.

17 Claims, 5 Drawing Sheets

(51) Int. Cl.
  *F21V 8/00* (2006.01)
  *G02B 15/10* (2006.01)
  *G02B 15/22* (2006.01)
  *G03B 15/05* (2006.01)
  *G02B 21/00* (2006.01)
  *G02B 21/34* (2006.01)

(52) U.S. Cl.
  CPC ............. *G02B 15/10* (2013.01); *G02B 15/22* (2013.01); *G02B 21/0008* (2013.01); *G02B 21/34* (2013.01); *G03B 15/05* (2013.01); *H04M 1/02* (2013.01); *H04M 1/0264* (2013.01); *G02B 6/0016* (2013.01); *G02B 6/0051* (2013.01); *G03B 2215/0503* (2013.01); *G03B 2215/0567* (2013.01); *G03B 2215/0592* (2013.01)

(58) Field of Classification Search
  CPC .... G02B 21/34; G02B 21/0008; G03B 15/05; G03B 17/565; G03B 2215/0503; G03B 2215/0567; G03B 2215/0592; H04M 1/02; H04M 1/0264
  See application file for complete search history.

(56) References Cited

FOREIGN PATENT DOCUMENTS

| | | |
|---|---|---|
| KR | 10-1479609 B1 | 12/2014 |
| KR | 10-1493333 B1 | 2/2015 |
| KR | 10-1550682 B1 | 9/2015 |
| KR | 10-2015-0124557 A | 11/2015 |
| KR | 10-1591902 B1 | 2/2016 |

* cited by examiner

MAGNIFICATION-PURPOSE EXTERNAL OPTICAL MODULE EXTERNAL TO PORTABLE TERMINAL WITH CAMERA, AND MAGNIFICATION IMAGING DEVICE INCLUDING THE SAME

CROSS-REFERENCE TO RELATED APPLICATIONS

This application is a national stage of International Application No. PCT/KR2016/004206, filed Apr. 22, 2016, which claims the benefit of priority Korean Application No. 10-2016-0047183, filed Apr. 18, 2016, in the Korean Intellectual Property Office, the disclosures of which are incorporated herein in their entireties by reference.

TECHNICAL FIELD

The present invention relates to a magnification-purpose external optical module using an LED and a camera installed in a portable terminal such as a smart phone, and a magnification imaging device including the same.

BACKGROUND ART

Portable terminals, such as smart phones or tablets that are recently, widely used externally include LEDs and cameras for imaging external subjects. Users perform imaging without illumination or in the case where illumination is needed, they allow the LEDs to be turned on and then perform imaging. Thus, the camera and LED are disposed in proximity to one surface of the portable terminal.

Recently, a camera for a smart phone provides resolution similar to a digital camera for a general specialist. Thus, various devices using a smart phone camera are emerging and one of them is a microscope, which captures a magnified image of an object by using a lens additionally installed at the smart phone camera.

A general microscope is designed in a structure that includes an ocular lens and an object lens in opposite ends of a single body tube. The object lens facing a subject is a lens having an extremely short focal length and makes a magnified real image of an object, and the ocular lens facing a user's eyes is a magnifying lens that sees it. A magnification of the microscope may be found by the multiplying of a magnification of the object lens and a magnification of the ocular lens.

A camera that is installed by default in a smart phone generally includes an auto focus (AF) function to change a focal length by minutely changing the distance between an internal lens and an image sensor. At this point, a minimum focal length is set for each camera internal to the smart phone, and a shortest object distance is set according to the minimum focal length. If a subject is located within the shortest object distance, it is difficult to perform imaging or an unclear image may be obtained because the camera is out of focus. Thus, in order to use the smart phone camera as the microscope or the magnifying lens, there is a need for a measure, such as adding a separate object and ocular lens external to the camera to change the focal length and magnify in a certain proportion.

For these purposes, research and development in a type of an optical device that is installed in an internal camera of a smart phone has also been performed in the past. For example, there are a Lupe (magnifying lens) type macro lens and a type of a microscope.

The microscope type includes an object lens and an ocular lens in a body tube like an actual microscope, and a smart phone camera is installed at an ocular lens to be used to produce a digital image. These products are much greater than smart phones, so it is a more accurate expression that the smart phone is installed at such a product and it is difficult to carry it accordingly. With an increase in magnification, the length of a body tube gets longer. For example, Korean Patent No. 1591902 or 1550682 relates to a cradle for holding a smart phone on a microscope and is invention similar to this kind.

The Lupe type macro lens is smaller than the microscope type in volume but has a smaller magnification, and is significantly affected by ambient light because it uses external light. For example, in a backlight state in which illumination is behind a subject, an image of a subject may not be correctly formed because too much light enters a camera, and in the case where surroundings are too dark, it may be difficult to perform imaging because of a lack of lighting.

In the case of the Lupe type, there is also a need to adjust a lens magnification to focus on a nearby object, but in order to obtain a clear image, there is a need to illuminate the object with sufficient light in a state in which external light is blocked. Since it is difficult to solve such a limitation due to the reason that such a fundamental solution affects the pricing of a product, a typical Lupe type lens have no choice but to abandon a clear image instead of securing an amount of light by using external light as it is.

As such, typical devices that have been installed at a smart phone to function as the microscope or magnifying lens are too large and it is uneasy to carry them, or even when it is easy to carry them, there were many types of devices that have instable performance by external light.

RELATED ART LITERATURE

1. Smart phone cradle for microscope connection (Korean Patent No. 1591902)

It relates to a cradle for holding a smart phone on a microscope and is invention of a different type from the purpose of the present invention.

DISCLOSURE OF THE INVENTION

Technical Problem

The purpose of the present invention is to provide a high-magnification magnification-purpose external optical module that uses an LED and a camera internal to a portable terminal such as a smart phone and thus does not need a separate lighting source, and a magnification imaging device including the same.

Furthermore, another purpose of the present invention is to provide an external optical module including a light guide that is implemented to be capable of sufficiently illuminating a subject with a relatively distant LED with respect to a significantly short designed focal length.

Another purpose of the present invention is to provide a magnification-purpose external optical module that may be universally applied to portable terminals that have different gaps between camera parts and LEDs.

Another purpose of the present invention is to provide a magnification-purpose external optical module that includes a function of adjusting the focal length to be universally applied to portable terminals of which the camera parts have different focal lengths and that is implemented to have a thin thickness.

Another purpose of the present invention is to provide a thin magnification-purpose external optical module that allows a high magnification and does not use an ocular lens and a body tube in order to thin the thickness of the entire product.

Technical Solution

In order to achieve the above purposes, an external optical module of the present invention can be installed at a portable terminal that includes a camera part and an LED, and use light from the LED to form a magnified image of a subject with the camera part.

The external optical module includes a housing, a light guide, and a complex lens part. A first though hole being in contact with the subject is formed on a top surface of the housing, a first through hole and a third through hole that face the LED and the camera part, respectively are formed on a bottom surface of the housing, and other parts of the housing are closed. The light guide is a transparent panel housed in the housing and has a light entering surface exposed through the second through hole and a light emitting surface formed toward the first through hole, wherein the light guide receives and transfers light emitted from the LED through the light entering surface, emits the light through the light emitting surface, and illuminates the subject being in contact with the first through hole. The complex lens part has a plurality of lens, is disposed between the first through hole and the third through hole in the housing to magnify an image reflected and entering from the subject, and forms the magnified image in the camera part through the third through hole to allow the camera part to produce a digital image (or picture) when installing at the portable terminal.

According to an embodiment, the external optical module may further include a fixing ring that is in a shape of a ring at the center of which a hole is formed, and may be provided over the light emitting surface of the light guide. A surface of the fixing ring facing the light emitting surface may be implemented in a slope to allow light emitted through the light emitting surface to be reflected to the subject to sufficiently illuminate the fixing ring.

Here, the fixing ring may be installed at the first through hole of the housing to be vertically transferable to adjust an optical location of the subject being in contact with the hole. For example, at least one protrusion may be formed on the through hole, at least one spiral groove fitting in an external surface of the fixing ring being in contact with the first through hole, the fixing ring and the first through may be screw-connected. When the fixing ring rotates, a vertical height of the fixing ring may be adjusted.

According to another embodiment, the light guide may include (1) an illumination light entering part that faces the LED of the portable terminal and is in a shape of a transparent flat plate in which the light entering surface is formed on a bottom surface, (2) an illumination light emitting part that is provided on an outer circumference of the complex lens part and is in a shape of a transparent flat plate that emits light transferred from the illumination light entering part through the light emitting surface formed on its top surface, and (3) a reflective plate that covers an external surface of the light guide except for the light entering surface and the light emitting surface to prevent light inside the illumination light entering part and the illumination light emitting part from becoming emitted to outside. The illumination light entering part and the illumination light emitting part may be integrally formed.

According to an embodiment, a top surface of the illumination light entering part, which is an opposite side of the light entering surface, may be formed to slope toward the illumination light emitting part to allow the illumination light entering part to effectively transfer light entering through the light entering surface toward the illumination light emitting part.

According to another embodiment, the light entering surface of the light guide may be formed to be multiple times an area on which light emitted from the LED illuminates when installing at the portable terminal. At this point, the light entering surface may be formed to be long lengthwise toward the illumination light emitting part to be universally used for portable terminals having a different gap between the camera part and the LED.

The light entering surface of the light guide may include at least one slope that refracts incident light toward the illumination light emitting part and is of a type that is formed side by side toward the illumination light emitting part. As another example, the light entering surface of the light guide may be formed in an uneven shape to decrease a proportion that light emitted from the LED is reflected to outside.

In another embodiment, the light emitting surface of the illumination light emitting part may be formed as an uneven surface to emit light to outside without reflecting back to inside of the light guide.

In another embodiment, the external optical module may further include a diffusion plate that is attached to the light emitting surface to make light emitted from the light emitting surface even.

In another embodiment, the external optical module may further include a pin-hole lens that is provided between the complex lens part and a third through hole to deeply adjust depth of focus of the complex lens part.

The present invention covers a magnification imaging device that includes a portable terminal and an external optical module that is installed at an external surface of the portable terminal. At this point, the portable terminal may include an image processing unit that allows the LED to be turned on in a magnification imaging mode and then allows the camera part to produce an image entering from the external optical module as a digital image.

Advantageous Effects

An external optical module of the present invention may use an LED and a camera internal to a portable terminal such as a smart phone and thus capture a high magnification image without a separate lighting source.

Furthermore, because a thickness of an external optical module of the present invention is implemented to be significantly thin, the mixed focal length of the magnification imaging device is designed to be significantly short. And by the same reason, the external optical module does not need to use a separate lighting source because it is possible to sufficiently illuminate a subject only with a relatively distant LED in contrast to a thinned thickness.

An external optical module of the present invention may be universally applied to portable terminals that have different gaps between camera parts and LEDs, and use a function of adjusting the focal length to be capable of being universally applied to portable terminals of which the camera parts have different focal lengths.

An external optical module of the present invention may allow a high magnification and has thinned the thickness of the entire product with the removal of an ocular lens and a long body tube.

BRIEF DESCRIPTION OF REFERENCE NUMERALS

Figure 1:
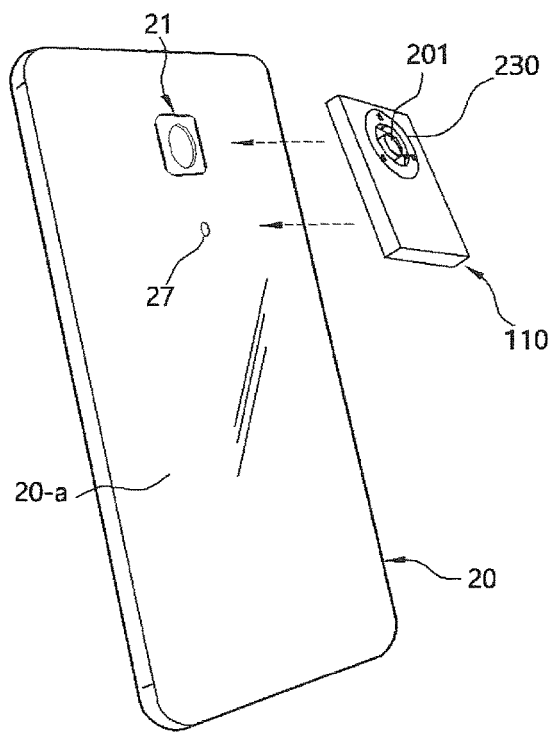
FIG. 1 shows an example of a magnification imaging device that an external optical module is installed at a portable terminal according to an embodiment of the present invention.

20: Portable terminal
21: Camera part
27: LED
110: External optical module
201: Complex lens part
201a: Body tube of complex lens part
210: Light guide
211: Illumination-light entering part
211a: Light entering surface
213: Illumination-light emitting part
213a: Light emitting surface
215: Lens hole
230: Fixing ring
230a: Hole
230b: Slope
231: Spiral groove
233: Adjusting groove
250: Pin-hole lens
270: Housing
270a: Top surface of housing
270b: First through hole
270c: Bottom surface of housing
270d: Second through hole
270e: Third through hole

MODE FOR CARRYING OUT THE INVENTION

In the following, the present invention is described in more detail with reference to the accompanying drawings.

Figure 2:
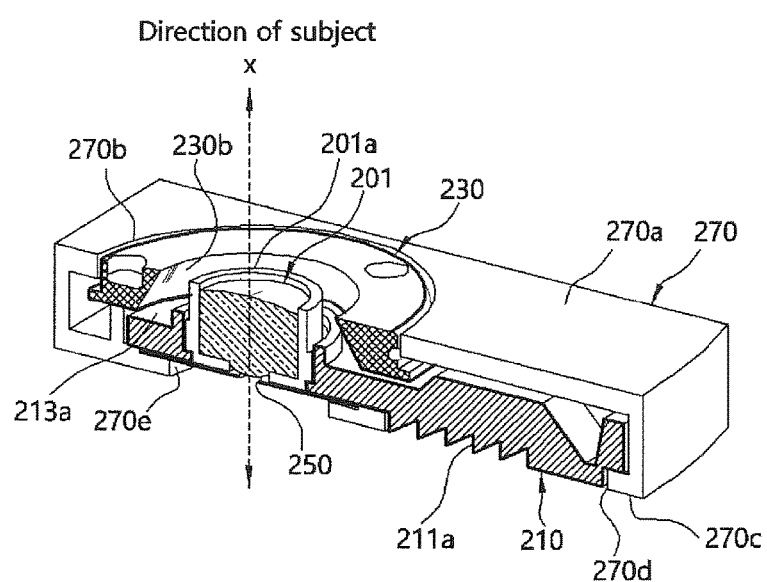
FIG. 2 is a cross-sectional view of an external optical module according to an embodiment of the present invention.
Figure 3:
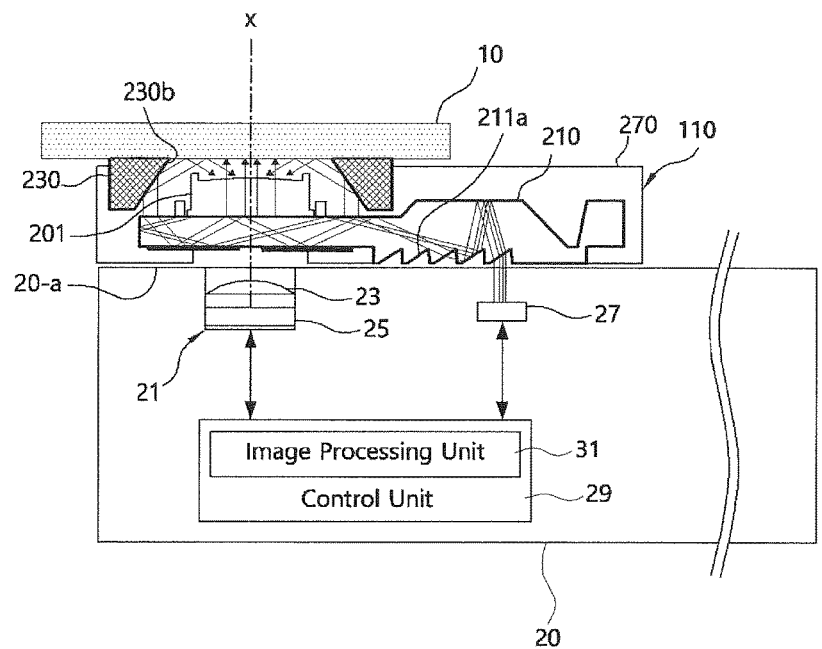
FIG. 3 is a conceptual view of an external optical module when it is installed at a portable terminal for the description of the operation of an external optical module of the present invention.

Referring to FIGS. 1 to 3, a magnification imaging device 100 of the present invention includes a portable terminal 20 and an external optical module 110. The external optical module 110 is a device installed at a surface 20-a through which a camera part 21 of the portable terminal 20 and an LED 27 are exposed, and allows magnification imaging with a certain magnification, providing an optical path between the portable terminal 20 and an subject 10 and adjusting the shortest object distance of the portable terminal 20.

As described earlier, the portable terminal 20 includes any types of devices of which the camera part 21 and LED 27 are exposed through the same surfaces 20-a and which include control units 29, and an example thereof includes a smart phone, a tablet computer, a personal digital assistant (PDA) or the like. Naturally, the portable terminal 20 may further include configurations related to its major functions (e.g., mobile communications) or other functions. However, since these configurations or functions are neither essential for the present invention nor contribute to the description of the present invention, they are not shown in the drawings and their descriptions are omitted.

The camera part 21 and the LED 27 are disposed at the same surface 20-a of the portable terminal 20, and when the external optical module 110 is installed, they face a third through hole 270e and a second through hole 270d, respectively. The camera part 21 includes at least one internal lens 23 and an image sensor 25, and has the minimum focal length and the shortest object distance that are designed according to the structure and operating mechanism of the camera part 21.

The camera part 21 and the LED 27 are controlled by the control unit 29 of the portable terminal 20. The control unit 29 controls the general operation of the portable terminal 20, and includes an image processing unit 31 for the characteristic operation of the present invention. The image processing unit 31 controls the LED 27 and the camera part 21 to control a magnification imaging process for the subject 10 in a state in which the external optical module 11 is installed.

The control unit 29 may be construed as a configuration especially installed for the present invention, but may also be fundamental configurations that are installed to perform the major function of the portable terminal 20 or other functions. In the case where the control unit 29 is a fundamental installed to perform the major function of the portable terminal 20 or other functions as above, the control unit 29 may functionally indicate a configuration that is implemented in a processor chip, hardware that the portable terminal 20 fundamentally holds, and an operating system program and/or application, software that is processed by the chip. Here, the application is a software made by a program language that may be interpreted by a computer to process a series of designated commands.

In this case, the image processing unit 31 is a kind of application and may be a program or a set of programs that are especially installed for the implementation of the present invention and performed by the processor chip and the operating system.

In particular, the image processing unit 31 turns on the LED 27 in a magnification imaging mode in order to allow the LED 27 to emit light for imaging the subject 10, and allow the camera part 21 to capture an image entering through the external optical module 110 and to generate a digital image (or video), and if necessary, allow the image to be displayed through a display unit (not shown). One of differences between the image processing unit 31 of the present invention and a typical camera imaging application is that the LED 27 is turned on for a basic operation of the external optical module 110 even when the camera part 21 does not capture an actual image. The operation of the image processing unit 31 is again described below.

Referring to FIG. 2, the external optical module 110 is installed on the camera part 21 and the LED 27 of the portable terminal 20. The external optical module 110 of the present invention may focus on a subject located within the shortest object distance of the camera part 21 for imaging and at the same time, enable imaging to be performed with a certain magnification.

In this case, the external optical module 110 needs to sufficiently decrease the focal length to secure a magnification, the thickness thereof significantly decreases with a decrease in the focal length, and the thinned thickness reinforces the portability of the external optical module 110. As such, the external optical module 110 provides a closed optical path that leads from the LED 27 to the subject 10 and the camera part 21 so that it is possible to sufficiently illuminate the subject 10 with the LED 27 relatively distant in contrast to the thinned thickness of the external optical module 110. The closed optical path prevents the definition of an image captured by external light from becoming damaged.

To this end, the external optical module 110 of the present invention includes a complex lens part 201, a light guide 210, a fixing ring 230, a pin-hole lens 250, and a housing 270 that houses them. In the following, unless otherwise described, the internal components and operations of the external optical module 110 are described based on when the external optical module 110 is installed at the portable terminal 20, for the convenience of description.

The housing 270 houses the complex lens part 201, the light guide 210, the fixing ring 230, and the pin-hole lens 250 in a closed internal space. Also, the housing 270 provides a closed optical path leading from the LED 27 to the subject 10 and a closed optical path leading from the subject 10 to the camera part 21 to prevent external light from entering the optical path to prevent an image from blurring by optical interference. Also, the housing 270 provides a structure attachable to and detachable from the external surface 20-a of the portable terminal 20.

Although there may be various methods to obtain a clear image of the subject 10, the present invention blocks external illumination (e.g., natural light or interior illumination) to image the subject 10 with only illumination from the LED 27 provided in a closed state through the external optical module 110 to remove interference by external illumination.

Also, the internal surface of the housing 270 is coated with black paint to prevent light from becoming reflected from the internal surface of the housing 270 to allow light reflected directly from the subject 10 to enter the complex lens part 201.

The housing 270 is provided in the shape of a thin panel or box. A first through hole 270b being in contact with the subject 10 is formed in the top surface 270a of the housing 270, the second through hole 270d facing the LED 27 of the portable terminal 20 and the third through hole 270e facing the camera part 21 are formed in the bottom surface 270c of the housing 270.

The first through hole 270b and the third through hole 270e are formed so that the central axis x of the complex lens part 201 passes vertically through the center of each of the through holes. The external optical module 110 is installed at the portable terminal 20 so that the central axis x of the complex lens part 201 matches the optical central axis of the camera part 21, so an optical path leading from the subject 10 to the camera part 21 is formed.

The second through hole 270d has a size that may cover the LED 270, the third through hole 270e has a size that may cover the camera part 21, and the second through hole 270d and the third through hole 270e are in contact with the external surface 20-a of the portable terminal 20 so that the camera part 21 and the LED 27 meet the optical system of the external optical module 110.

According to an embodiment, instead of the second through hole 270d and the third through hole 270e, a single through hole that simultaneously covers the camera part 21 and the LED 27 may also be formed in the bottom surface 270c of the housing 270.

In addition to blocking external illumination in order to obtain a clear image of the subject 10, the external optical module 110 of the present invention is implemented to adjust the distance between the subject 10 and the complex lens part 201 within a certain range by using the fixing ring 230 to be capable of accurately focusing.

It is difficult for such a small device to include a means for adjusting the focal length or a magnification. Thus, the external optical module 110 of the present invention is set to have a fixed magnification and focal length based on the height of the fixing ring 230 and guides the subject 10 to be in contact with the external surface of the fixing ring 230. In view of the focal length and magnification, the height of the fixing ring 230 should be determined.

Firstly, because the subject 10 is in contact with the fixing ring 230, the height of the fixing ring 230 means the distance between the subject 10 and the complex lens part 201, and a magnification is also determined accordingly. For example, as the location of the subject 10 approaches the complex lens part 201, an image of the subject 10 is magnified. As the external optical module 110 is installed at the portable terminal 20, the camera part 21 and the external optical module 110 have the 'composite shortest object distance', the newly adjusted shortest object distance, in which case it is possible to magnify an image by disposing the subject 10 close to the camera part 21 as the shortest object distance decreases. In order to focus on the subject 10, the height of the fixing ring 230 should be equal to or higher than the 'composite shortest object distance'.

Thus, there is a need to set the distance to the subject 10, i.e., the reference height of the fixing ring 230 from the complex lens part 201 according to a magnification of an image to be obtained through the external optical module 110, in consideration of a magnification and the shortest object distance according to the optical zoom that is additionally provided by the complex lens part 201.

The problem is that the focal length applied to the camera part 21 varies depending on the type and manufacturer of the portable terminal 20. Thus, there is a need to adjust the distance between the subject 10 and the camera part 21 within a certain range. For these reasons, the height of the fixing ring 230 may be adjusted by a user within a certain range based on the reference height.

Figure 4:
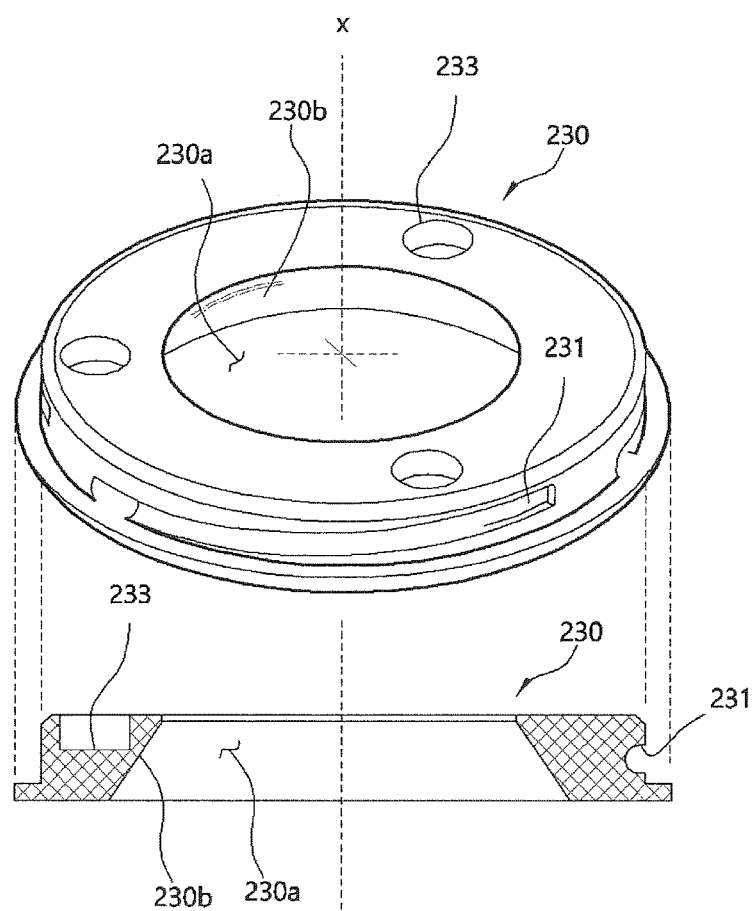
FIG. 4 is a perspective view of a fixing ring in FIG. 2 and a cross-sectional view thereof.

An example of adjusting the height of the fixing ring 230 may include screw connection of the fixing ring to the housing 270 as in FIG. 4. Since at least one spiral thread groove 231 that is fit on the protrusion (not shown) on the housing 270 is formed in the external surface of the fixing ring 230, it is possible to vertically adjust the location within a certain range along the central axis x when rotating along the protrusion (not shown). In an embodiment of FIG. 4, three thread grooves 231 are formed in the external surface, and three adjusting grooves 233 are formed in the top surface of the fixing ring 230 to be capable of rotating the fixing ring 230 by using external force. In FIG. 4, when the fixing ring 230 is rotated clockwise, the fixing ring 230 is moved downwards and the height thereof decreases, and when the fixing ring 230 is rotated anticlockwise, the fixing ring 230 is moved upwards and the height thereof increases.

Since the present invention does not present the contact between the subject 10 and the fixing ring 230 as a necessary configuration or method, a user may perform imaging in a state in which the subject 10 is apart from the external optical module 110. By increasing the depth of focus by the pin-hole lens 250 to be described below, the camera is set to be in focus despite a more or less difference in location.

The fixing ring 230 has a shape of a circular ring at the center of which a through hole 230a is formed, and is screw-connected to the first through hole 270b of the housing 270 as described above in a state in which the top surface of the edge of the fixing ring 230 is exposed to the outside. The subject 10 is in contact with the hole 230a of the fixing ring 230.

Regarding the disposition of the fixing ring 230, the fixing ring 230 is aligned so that the central axis x of the complex lens part 201 vertically passes through the center of the hole 230a, and is installed in such a manner that the complex lens part 201 fitted into the lens hole 215 of the light guide 210 is inserted into the hole 230a through the bottom surface of the fixing ring 230. However, the fixing ring 230 is apart from the light guide 210 or the complex lens part 201.

As the hole 230a of the fixing ring 230 gradually widens downwards, the internal surface of the fixing ring 230 forming the hole 230a becomes a slope 230b. The tilt angle of the slope 230b is an obtuse angle that is greater than 90° from the lower part toward the upper part.

The slope 230b of the fixing ring 230 is located over the light emitting surface 213a of the light guide 210 and formed as a reflective surface that reflects light so that light emitted from the light emitting surface 213a of the light guide 210 toward the first through hole 270b is reflected toward the subject 10 to illuminate the subject 10.

The complex lens part 201 is disposed between the first through hole 270b and the third through hole 270e in a state in which it is inserted into the lens hole 215 of the light guide 210, and performs a role in forming an image reflected and entering from the subject 10 with the camera part 21. Thus, when installing the external optical module 110 at the portable terminal 20, there is a need to align it so that the central axis x of the complex lens part 201 matches a virtual optical axis that vertically passes the center of the camera part 21.

The complex lens part 201 itself may be provided to be of a type that is inserted into a separate body tube 201a to prevent light emitted from the light emitting surface 213a of the light guide 110 or light reflected from the slope 230b of the fixing ring 230 from directly entering the complex lens part 201.

Also, the complex lens part 201 decreases the shortest object distance of the camera part 21 to perform the function of decreasing the 'composite shortest object distance' of the complex lens part 201 and the camera part 21 and should have thin thickness in order to enhance the portability of the external optical module 110.

To this end, the complex lens part 201 may use a plurality of aspherical lens that has a short focal length and is capable of removing distortion occurring at a high magnification. Thus, the present invention does not use an ocular lens fundamentally needed for a magnification lens or microscope and may remove a body tube that connects an object lens to the ocular lens.

The light guide 210 is manufactured from a transparent material that may transfer light and is disposed over the LED 210 and the camera part 21 to present the optical path between the LED 27 and the subject 10 to illuminate the subject 10.

The light guide 210 includes an illumination light entering part 211 and an illumination light emitting part 213 and includes a reflective plate (not shown) attached to the external surface of the light guide 210 except for a light entering surface 211a and the light emitting surface 213a. When the external optical module 110 is installed at the portable terminal 20, the illumination light entering part 211 and the illumination light emitting part 213 should be disposed to face the LED 27 and the camera part 21 of the portable terminal 20, respectively.

The illumination light entering part 211 is formed from a transparent material in the shape of a substantially flat plate over the LED 27, the light entering surface 211a that receives light emitted from the LED 27 is exposed to the outside through the second through hole 270d, and other parts are housed in the housing 270.

The illumination light emitting part 213 is of the shape of a ring at the center of which the lens hole 215 into which the complex lens part 201 is inserted is formed, and the light emitting surface 213a that emits light upwards is formed along the outer circumference of the lens hole 215. The illumination light emitting part 213 emits light transferred from the illumination light entering part 211 to the slope 230b of the fixing ring 230 through the light emitting surface 213a to illuminate the subject 10 being in contact with the hole 230a of the fixing ring 230.

Since the reflective plate (not shown) is attached to the outer surface of the light guide 210 except for the light entering surface 211a and the light emitting surface 213a, light entering the light entering surface 211a may be reflected from the reflective plate (not shown) to be emitted to the outside through only the light emitting surface 213a. The reflective plate (not shown) may be of any type that allows a reflective surface to face the light guide 210 or that is coated with a reflective material.

According to another embodiment, it is also possible to attach the reflective plate to the internal surface of the housing 270 without attaching the reflective plate to the outer surface of the light guide 210. However, such a manner may be difficult to efficiently illuminate the subject 10 or fail to sufficiently illuminate the subject 10 due to re-emission through the light entering surface 213a.

Although the illumination light entering part 211 and the illumination light emitting part 213 may be individually formed to be disposed to be apart each other, they may be integrally formed as shown in FIGS. 2, 3, 5 and 6.

Figure 5:
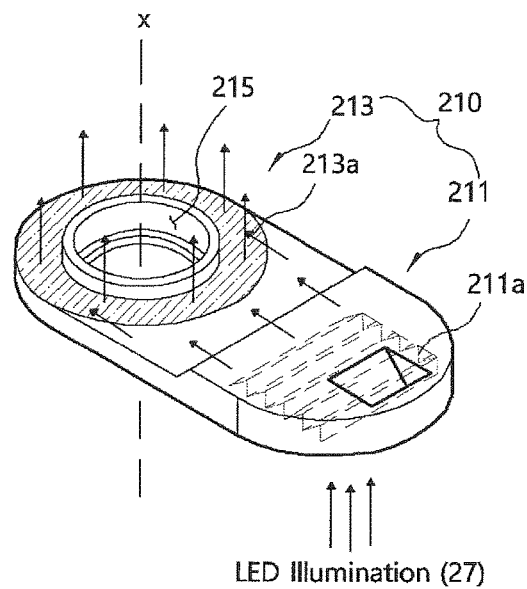
FIG. 5 is a perspective view of a light guide according to an embodiment of the present invention.

The light guide 210 shown in FIG. 5 is in the shape of a single transparent flat plate in which the illumination light entering part 211 and the illumination light emitting part 213 are integrally formed. As will be described below, the lens hole 215 that passes through the light guide 210 is provided at the center of the illumination light emitting part 213 in order to dispose the complex lens part 201. A reflective plate (not shown) is attached to the outer surface except form the light entering surface 211a and the light emitting surface 213a so the light guide 210 becomes a light transfer means.

Although the illumination light entering part 211 may fundamentally be in the shape of a flat plate, it may include at least one of the following (1) to (3) in order to transfer light received from the LED 27 through the light entering surface 211a to the illumination light emitting part 213.

(1) The area of the light entering surface 211a may be implemented to be wider (e.g., multiple times in size) than an area that light emitted from the LED 27 reaches the light entering surface 211a when being installed at the portable terminal 20.

Furthermore, when considering that the gap between the camera part 21 and the LED 27 varies depending on the portable terminal 20, the light entering surface 211a may be disposed to be sufficiently long toward the illumination light emitting part 213 to correspond to the gap between the camera part 21 and the LED 27 that varies depending on the portable terminal.

(2) The light entering surface 211a may be formed as a slope that refracts incident light toward the illumination light emitting part 213.

Figure 6:
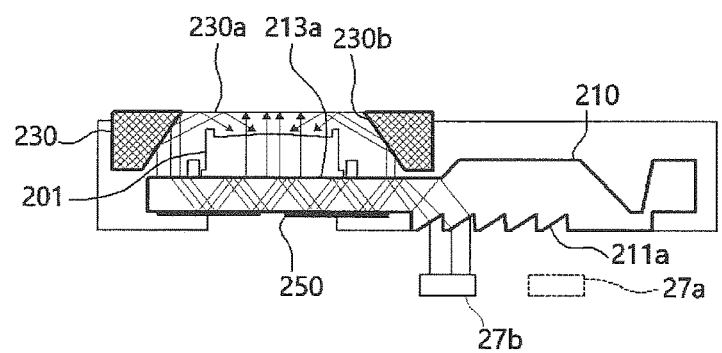
FIG. 6 is a conceptual view of an external optical module for the description of the operation of an external optical module.

In the case the light entering surface 211a is disposed to be long lengthwise toward the illumination light emitting part 213, a plurality of slopes is disposed side by side toward the illumination light emitting part 213 so that the cross section of the light entering surface 211a has a saw tooth. Referring to FIGS. 3 and 6, even when the locations of the LEDs 27a and 27b having different locations are different, the light entering surface 211a may refract incident light toward the illumination light emitting part 213.

In another example, the light entering surface 211a may be shaped with a simple uneven shape. The light entering surface having the uneven shape decreases the proportion that light emitted from the LED 27 is totally reflected (or reflected) from the light entering surface 211a to the outside, and allows the light to be refracted into the inside of the illumination light entering part 211.

(3) It is desirable to form as a slope so that other surfaces of the illumination light entering part 211 except for the light entering surface 211a may also refract light passing through the light entering surface 211a toward the illumination light emitting part 213.

The illumination light entering part 213 allows light transferred from the illumination light entering part 211 to be emitted through a whole of the light emitting surface 213a that is formed along the outer circumference of the complex lens part 201. Thus, a reflective plate is attached to the external surface of the illumination light emitting part 213 except for the light emitting surface 213a. Although the light emitting surface 213a shown in FIG. 5 is formed along a whole of the outer circumference of the lens hole 215 in which the complex lens part 201 is installed, it may also be formed along only a portion of the outer circumference of the lens hole 215.

The light emitting surface 213a may be formed as a certain uneven surface so that light from the illumination light emitting part 213 is not reflected from the light emitting surface 213a back to the inside but emitted to the outside, and naturally, the uneven surface of the light emitting surface 213a may be significantly fine in comparison to the uneven surface of the light entering surface 211a. For example, it is possible to perform processing, such as sanding or polishing on the light emitting surface 213a. Additionally, in order to make light emitted from the light emitting surface 213a even, it is also possible to attach a diffusion plate (not shown) to the light emitting surface 213a that is the uneven surface.

The pin-hole lens 250 is to increase the depth of focus and is a simple fine hole (pin hole), and an image is input to the camera part 21 through only the pin hole. The pin-hole lens 250 is disposed beneath the light guide 210 and aligned so that the central axis x of the complex lens part 201 vertically passes the center of the pin-hole lens 250. Although the pin-hole lens 250 is not an essential configuration of the present invention, the pin-hole lens 250 disposed between the complex lens part 201 and the camera part 21 may adjust the focus by increasing the depth of focus in line with the phenomenon that the depth of focus decreases with an increase in magnification of the complex lens part 201.

<Magnification Imaging Device in Which Portable Terminal and External Optical Module are Combined, and Operation Thereof>

A user installs the external optical module 110 in the portable terminal 20. At this point, installation should be performed so that the center of the third through hole 270e matches the center of the camera part 21 and the LED 27 faces the light entering surface 211a. Although the gap between the camera part 21 and the LED 27 varies depending on the portable terminal 20, it is possible to apply to all of various portable terminals 20 because the light entering surface 211a is disposed to be long lengthwise.

The subject 10 to be captured as a magnified image is in close contact with the hole 230a of the fixing ring 230.

The image processing unit 31 allows the LED 27 to be turned on according to the control of the user to performing a close-up on the subject 10, and allows the camera part 21 to produce a digital image.

Light emitted from the LED 27 enters the light guide 210 through the light entering surface 211a, is reflected or refracted inside the light guide 210, is emitted through the light emitting surface 213a of the illumination light emitting part 213, and is reflected from the slope 230b of the fixing ring 230 to illuminate the subject 10. Since the subject 10 is in contact with the hole 230a of the fixing ring 230, light reflected from the slope 230b illuminates the subject 10 and light (image) reflected from the subject 10 thus enters the complex lens part 201. An image magnified through the complex lens part 201 enters the camera part 21 through the pin-hole lens 250 and image formation is performed in the image sensor 25. The image formed in the image sensor 25 is displayed through a display unit (not shown).

In the case where the image displayed on the display unit (not shown) is out of focus more or less, the height of the fixing ring 230 is adjusted so that a clear image is displayed, while rotating the fixing ring 230 clockwise or anticlockwise by using the adjusting groove 233 of the fixing ring 230.

Since the external optical module 110 is in a closed structure, external natural light or interior illumination does not enter the inside of the external optical module 110 and thus prevents an image entering from the subject 10 to the complex lens part 201 from getting blurred or does not interfere with the image. Furthermore, since the complex lens part 201 is located in the body tube 201a, light emitted from the light emitting surface 213a does not directly enter the complex lens part 201 and thus does not blur or interfere with an image entering the complex lens part 201.

Although exemplary embodiments of the present invention are shown and described above, the present invention is not limited the above-described specific embodiments, many variations may be implemented by a person skilled in the art to which the present invention pertains, without departing from the subject of the present invention claimed in the claims, and such variations should not be understood separately from the technical spirit and prospect of the present invention.

The invention claimed is:

1. An external optical module for installing at an external surface of a portable terminal that has an LED and a camera part on the external surface, the external optical module comprising:
   a housing wherein a first through hole being in contact with a subject is formed on a top surface of the housing, a second through hole and a third through hole that face the LED and the camera part, respectively are formed on a bottom surface of the housing, and other parts of the housing are closed;
   a light guide that is a transparent panel housed in the housing and has a light entering surface exposed through the second through hole and a light emitting surface formed toward the first through hole, wherein the light guide receives and transfers light emitted from the LED through the light entering surface, emits the light through the light emitting surface, and illuminates the subject being in contact with the first through hole; and a complex lens part that has a plurality of lens, is disposed between the first through hole and the third through hole in the housing to magnify an image reflected and entering from the subject, and transfers the magnified image to the camera part through the third through hole when installing at the portable terminal to form the magnified image of the subject with the camera part and light from the LED.

2. The external optical module of claim 1, further comprising a fixing ring that is in a shape of a ring at the center of which a hole is formed, and is provided over the light emitting surface of the light guide, wherein a surface of the fixing ring facing the light emitting surface is implemented in a slope to allow light emitted through the light emitting surface to be reflected to the subject.

3. The external optical module of claim 2, wherein the fixing ring is installed at the first through hole of the housing to be vertically transferable to adjust an optical location of the subject being in contact with the hole.

4. The external optical module of claim 3, wherein at least one spiral groove fitting on at least one protrusion formed on the first through hole is formed in an external surface of the fixing ring being in contact with the first through hole, the fixing ring and the first through are screw-connected, and a height of the fixing ring is adjusted according to rotation of the fixing ring.

5. The external optical module of claim 1, wherein the light guide comprises:
   a transparent illumination light entering part that is provided over the LED and is in a shape of a flat plate formed on a bottom surface of the light entering surface;
   a transparent illumination light emitting part that is provided on an outer circumference of the complex lens part and is in a shape of a flat plate that emits light transferred from the illumination light entering part through the light emitting surface formed on a top surface; and
   a reflective plate that covers an external surface of the light guide except for the light entering surface and the light emitting surface to prevent light inside the illumination light entering part and the illumination light emitting part from becoming emitted to outside.

6. The external optical module of claim 5, wherein the illumination light entering part and the illumination light emitting part are integrally formed.

7. The external optical module of claim 5, wherein a top surface of the illumination light entering part, which is an opposite side of the light entering surface, is formed to slope toward the illumination light emitting part to allow the illumination light entering part to transfer light entering through the light entering surface toward the illumination light emitting part.

8. The external optical module of claim 5, wherein the light entering surface of the light guide is formed to be multiple times an area on which light emitted from the LED illuminates when installing at the portable terminal, wherein the light entering surface is formed to be long lengthwise toward the illumination light emitting part to be universally applied to portable terminals having a different gap between the camera part and the LED.

9. The external optical module of claim 5, wherein the light entering surface of the light guide comprises at least one slope that refracts incident light toward the illumination light emitting part and is formed side by side toward the illumination light emitting part.

10. The external optical module of claim 8, wherein the light entering surface is formed in an uneven shape to decrease a proportion that light emitted from the LED is reflected to outside and refract the light to inside of the illumination light entering part.

11. The external optical module of claim 5, wherein the light emitting surface of the illumination light emitting part is formed as an uneven surface to emit light to outside without reflecting back to inside of the light guide.

12. The external optical module of claim 5, further comprising a diffusion plate that is attached to the light emitting surface to make light emitted from the light emitting surface even.

13. The external optical module of claim 1, further comprising a pin-hole lens that is provided between the complex lens part and a third through hole to deeply adjust depth of focus of the complex lens part.

14. A magnification imaging device comprising a portable terminal that has a camera part and an LED on a same external surface, and the external optical module of claim 1 that is installed at an external surface of the portable terminal,
   wherein the portable terminal comprises an image processing unit that allows the LED to be turned on in a magnification imaging mode and then allows the camera part to produce an image entering from the external optical module as a digital image.

15. The external optical module of claim 8, wherein the light entering surface of the light guide comprises at least one slope that refracts incident light toward the illumination light emitting part and is formed side by side toward the illumination light emitting part.

16. A magnification imaging device comprising a portable terminal that has a camera part and an LED on a same external surface, and the external optical module of claim 2 that is installed at an external surface of the portable terminal,
   wherein the portable terminal comprises an image processing unit that allows the LED to be turned on in a magnification imaging mode and then allows the camera part to produce an image entering from the external optical module as a digital image.

17. A magnification imaging device comprising a portable terminal that has a camera part and an LED on a same external surface, and the external optical module of claim 5 that is installed at an external surface of the portable terminal,
   wherein the portable terminal comprises an image processing unit that allows the LED to be turned on in a magnification imaging mode and then allows the camera part to produce an image entering from the external optical module as a digital image.

* * * * *